United States Patent
Anderson et al.

(12)

(10) Patent No.: US 6,701,715 B2
(45) Date of Patent: Mar. 9, 2004

(54) VARIABLE GEOMETRY EJECTOR FOR A BLEED AIR SYSTEM USING INTEGRAL EJECTOR EXIT PRESSURE FEEDBACK

(75) Inventors: Morris G. Anderson, Mesa, AZ (US); Paul W. Banta, Phoenix, AZ (US); James W. Brackin, Gilbert, AZ (US); Robert Romano, Tempe, AZ (US); David W. Zmora, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 25 days.

(21) Appl. No.: 10/138,646

(22) Filed: May 2, 2002

(65) Prior Publication Data
US 2003/0205049 A1 Nov. 6, 2003

(51) Int. Cl.[7] .............................. F02C 6/08; F04F 5/48
(52) U.S. Cl. ......................... 60/782; 60/785; 417/187; 417/189
(58) Field of Search ...................... 60/782, 785, 39.23; 417/187, 189, 182

(56) References Cited

U.S. PATENT DOCUMENTS

| | | | |
|---|---|---|---|
| 1,421,841 A | * | 7/1922 | Schmidt ..................... 417/189 |
| 1,421,843 A | * | 7/1922 | Schmidt ..................... 417/189 |
| 2,625,009 A | | 1/1953 | Leggett et al. |
| 2,837,269 A | | 6/1958 | Torell |
| 3,098,696 A | * | 7/1963 | Messinger ................... 60/787 |
| 3,441,045 A | * | 4/1969 | Malone ...................... 417/189 |
| 3,558,051 A | * | 1/1971 | Strickler et al. ............... 239/1 |
| 3,631,672 A | | 1/1972 | Gentile et al. |
| 3,749,336 A | * | 7/1973 | Christensen et al. .... 244/134 B |
| 3,994,620 A | | 11/1976 | Spraker, Jr. et al. |
| 4,180,239 A | * | 12/1979 | Valukis ....................... 251/60 |
| 4,182,117 A | | 1/1980 | Exley et al. |
| 4,631,004 A | | 12/1986 | Mock |
| 4,711,084 A | | 12/1987 | Brockett |
| 5,014,606 A | | 5/1991 | Steiner et al. |
| 5,133,194 A | | 7/1992 | Army, Jr. et al. |
| 5,137,230 A | | 8/1992 | Coffinberry |
| 5,323,624 A | * | 6/1994 | Schwalm ..................... 62/401 |
| 5,327,744 A | * | 7/1994 | Frawley et al. ............... 62/401 |
| 5,560,195 A | | 10/1996 | Anderson et al. |
| 6,012,515 A | | 1/2000 | Stubbendorff et al. |

* cited by examiner

Primary Examiner—Ted Kim
(74) Attorney, Agent, or Firm—Robert Desmond, Esq.

(57) ABSTRACT

A system and method of using a variable geometry ejector for a bleed air system using integral bleed pressure feedback which utilizes a minimal amount of high-pressure air, thus improving the overall engine cycle performance and is easily adaptable to a multitude of different engine types. This is accomplished through the use of a variable ejector using downstream pressure feedback to control the flow and pressure.

30 Claims, 3 Drawing Sheets

VARIABLE GEOMETRY EJECTOR FOR A BLEED AIR SYSTEM USING INTEGRAL EJECTOR EXIT PRESSURE FEEDBACK

GOVERNMENT RIGHTS

This invention was made with Government support under Contract No. DAAE07-00-C-N086 awarded by the U.S. Government LV100 Program. The Government has certain rights in this invention.

BACKGROUND OF THE INVENTION

The present invention generally relates to bleed air systems and, more specifically, to a system and method of using a variable geometry ejector for a bleed air system which utilizes a minimal amount of high-pressure air, thus improving the overall engine cycle performance. This is accomplished through the use of a variable ejector using downstream pressure feedback to control the flow and pressure.

The present invention generally relates to bleed air systems within engines and more specifically to a variable geometry ejector for a bleed air system using integral bleed pressure feedback. The present invention may be used in any gas turbine engine and is particularly well suited for vehicles and aircraft.

Bleed air systems are used for many purposes within gas turbine engines including supplying auxiliary power, cooling air, and off design component matching. Regardless of the purpose bleed air must be sufficiently high pressure to insure a proper flow through the system. Bleed air is extracted after it has been compressed which requires extra work by the engine. Therefore, extra fuel consumption is always associated with gas turbine compressor bleed air, which does not produce power or thrust. Bleed air requirements can drastically reduce engine performance by robbing the engine of high pressure air that could be used to burn fuel and make power.

U.S. Pat. No. 4,711,084 discloses an ejector assisted compressor bleed for use in a gas turbine engine having multiple compressor stages. Bleed air is extracted through multiple apertures in the shroud of a low pressure compressor stage and collected in a reservoir surrounding the bleed apertures of the shroud. A supply passage directs bleed air from the reservoir to the desired component. An ejector nozzle is positioned in the supply passage to introduce a high pressure primary flow into the passage and draw, as a secondary flow, the relatively low pressure bleed air from the reservoir. The nozzle obtains its high pressure air from a high pressure stage of the compressor. It is the nature of an ejector that only a relatively minor amount of high pressure bleed air is needed to power the low pressure bleed system. When the engine is operating at design speeds, generally the bleed system will not need the ejector power and the high pressure supply can be shut down. The '084 patent controls the primary stream flow rate with the primary stream pressure. The primary stream pressure is a function of the engine design or characteristic. While such a system represents a significant advancement in the art, a variable device is needed that controls the downstream pressure while not being dependant on engine characteristics.

U.S. Pat. No. 4,631,004 issued to Mock discloses an actuator operatively connected with the control valve to selectively control flow of the motive fluid in accord with a pressure difference between the motive fluid and a selected and possible variable reference pressure. However it does not consider the possibility of using integral ejector downstream pressure feedback to control the ejector primary flow and ejector exit pressure.

As can be seen there is a need for an improved apparatus and method that is easily adaptable to a multitude of different engine types and provides a bleed system which utilizes a minimal amount of high-pressure air, thus improving the overall engine cycle performance.

SUMMARY OF THE INVENTION

The present invention is directed to a variable geometry bleed system using integral bleed pressure feedback which utilizes a minimal amount of high-pressure air, thus improving the overall engine cycle performance and is easily adaptable to a multitude of different engine types.

One aspect of the invention is a system for bleeding air from a compressor in an engine comprising a primary inlet, a secondary inlet, a variable geometry ejector, a mixing section, a diffuser with an upstream end and a downstream end, and a tube comprised of a diffuser feedback port and an actuator port. The diffuser feedback port may be in communication with the downstream end and the actuator port may be in communication with an ejector needle valve actuator. The ejector needle valve actuator may be comprised of a piston, at least one spring, and a vent. The needle is attached to the piston and extends into a nozzle area of the valve. There may be a first seal ring interposed between the ejector needle valve actuator and piston. There may also be a second seal ring interposed between the ejector needle valve actuator and the needle. The nozzle area may be annular. High pressure air may be introduced to the primary inlet. The needle, actuated by the piston, sets the nozzle area of the valve to control the high pressure flow-rate into a mixing section. Low pressure air may be led from the secondary inlet to the mixing section and allowed to mix with the high pressure nozzle flow forming a ejector exit mixed flow. The ejector exit mixed flow may be drawn from the upstream end of the diffuser to the downstream end of diffuser and allowed to flow through an opening and a diffuser feedback port. Air drawn through the diffuser feedback port may be drawn through the tube to the actuator port and introduced to the ejector needle valve actuator. As such, the downstream pressure feedback may be used to control the nozzle geometry to maintain an almost constant ejector exit pressure that is independent of the ejector flow-rate.

According to another aspect of the present invention, a system for bleeding air from a compressor in an engine is disclosed comprising a primary inlet, a secondary inlet, a variable geometry ejector, a mixing section, a diffuser with an upstream end and a downstream end, a tube comprised of a diffuser feedback port, and an actuator port. The diffuser feedback port may be in communication with the downstream end and said actuator port may be in communication with an ejector needle valve actuator. The ejector needle valve actuator may be comprised of a piston, two springs, and a vent. There may be a first seal ring interposed between the ejector needle valve actuator and piston. There may also be a second seal ring interposed between the ejector needle valve actuator and the needle. The needle is attached to the piston and extends into a nozzle area, wherein high pressure air introduced from said primary inlet at a flow between 0 and 30 ppm and a pressure between 10 and 200 psig is contained. The needle, actuated by the piston, sets the nozzle area of the valve to control the high pressure flow-rate into a mixing section, wherein low pressure air which may be led from the secondary inlet at a flow between 0 and 30 ppm and pressure between 0 and 40 psig to the mixing section and allowed to mix with the high pressure nozzle flow forming a ejector exit mixed flow. The ejector exit mixed flow may be drawn from the upstream end of the diffuser to the downstream end of diffuser and allowed to flow through an opening to a prioritization valve, NBC system and the diffuser feedback port, wherein air drawn to the diffuser feedback port may be drawn to the actuator port and introduced to the ejector needle valve actuator.

According to a further aspect of the present invention, an apparatus for bleeding air from a compressor in an engine is disclosed comprising a primary inlet, a secondary inlet, a variable geometry ejector, a mixing section, a diffuser with an upstream end and a downstream end, a tube comprised of a diffuser feedback port and an actuator port. The diffuser feedback port may be in communication with said downstream end and the actuator port may be in communication with an ejector needle valve actuator. The ejector needle valve actuator may be comprised of a needle attached to a piston, two springs, and a vent. The needle and piston may extend into a nozzle area, wherein high pressure air may be introduced from the primary inlet at a flow between 0 and 30 ppm and a pressure between 10 and 200 psig, wherein the needle, actuated by the piston, sets the nozzle area of the valve to control the high pressure flow-rate into a mixing section, wherein low pressure air which is led from said secondary inlet at a flow between 0 and 30 ppm and pressure between 0 and 40 psig to said mixing section and allowed to mix with said high pressure nozzle flow forming a ejector exit mixed flow. There may be a first seal ring interposed between the ejector needle valve actuator and piston. There may also be a second seal ring interposed between the ejector needle valve actuator and the needle. The ejector exit mixed flow is varied integrally according to the piston, and pressure of air introduced into the primary inlet and secondary inlet. The ejector exit mixed flow is drawn from the upstream end of the diffuser to the downstream end of diffuser and allowed to flow through an opening to a prioritization valve, NBC system and the diffuser feedback port, wherein air drawn to said diffuser feedback port may be drawn to the actuator port and introduced to the ejector needle valve actuator. This may be accomplished and varied integrally.

In another aspect of the present invention, a method for bleeding air from a multi-stage compressor in an engine is disclosed. This method may be comprised of allowing high pressure air to flow through a primary inlet to a nozzle area, wherein a portion of a piston is contained. The needle, actuated by the piston, sets the nozzle area of the valve to control the high pressure flow-rate into a mixing section. Low pressure air may be introduced to a secondary inlet and allowed to flow from the secondary inlet to the mixing section. The high pressure nozzle flow may be mixed with low pressure air to create ejector exit mixed flow with a pressure between the high pressure nozzle flow and low pressure air. The ejector exit mixed flow may be allowed to flow from the upstream end of the diffuser to the downstream end of the diffuser, wherein a portion of ejector exit mixed flow may be introduced to a diffuser feedback port and the remainder may be allowed to flow to an opening. The portion of ejector exit mixed flow that may be introduced to said diffuser feedback port may be drawn through a tube to the actuator port of the tube and introduced to an ejector needle valve actuator, wherein the piston is contained and a vent. The position of the piston is controlled by the difference in force created by springs in communication with said piston and the static pressure of the ejector exit mixed flow introduced through said actuator port to ejector needle valve actuator.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a variable geometry bleed system using integral bleed pressure feedback which utilizes a minimal amount of high-pressure air, thus improving the overall engine cycle performance and is easily adaptable to a multitude of different engine types. This is unlike the prior art in that the pressure may be automatically adjusted utilizing downstream pressure.

Figure 1:
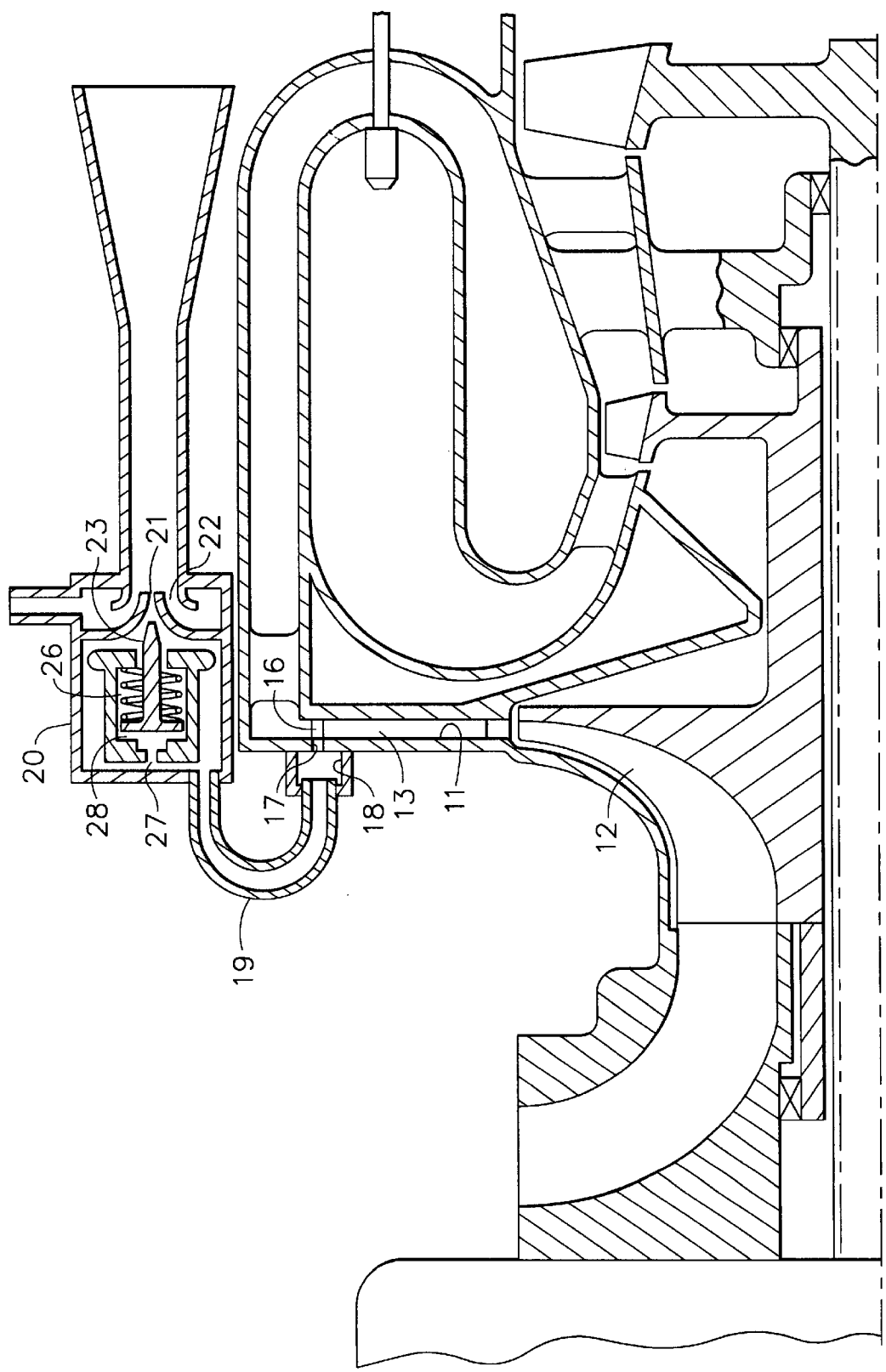
FIG. 1 is a sectional view of a prior art diffuser vane cusp bleed aperture with automatic ejector control.
Figure 2:
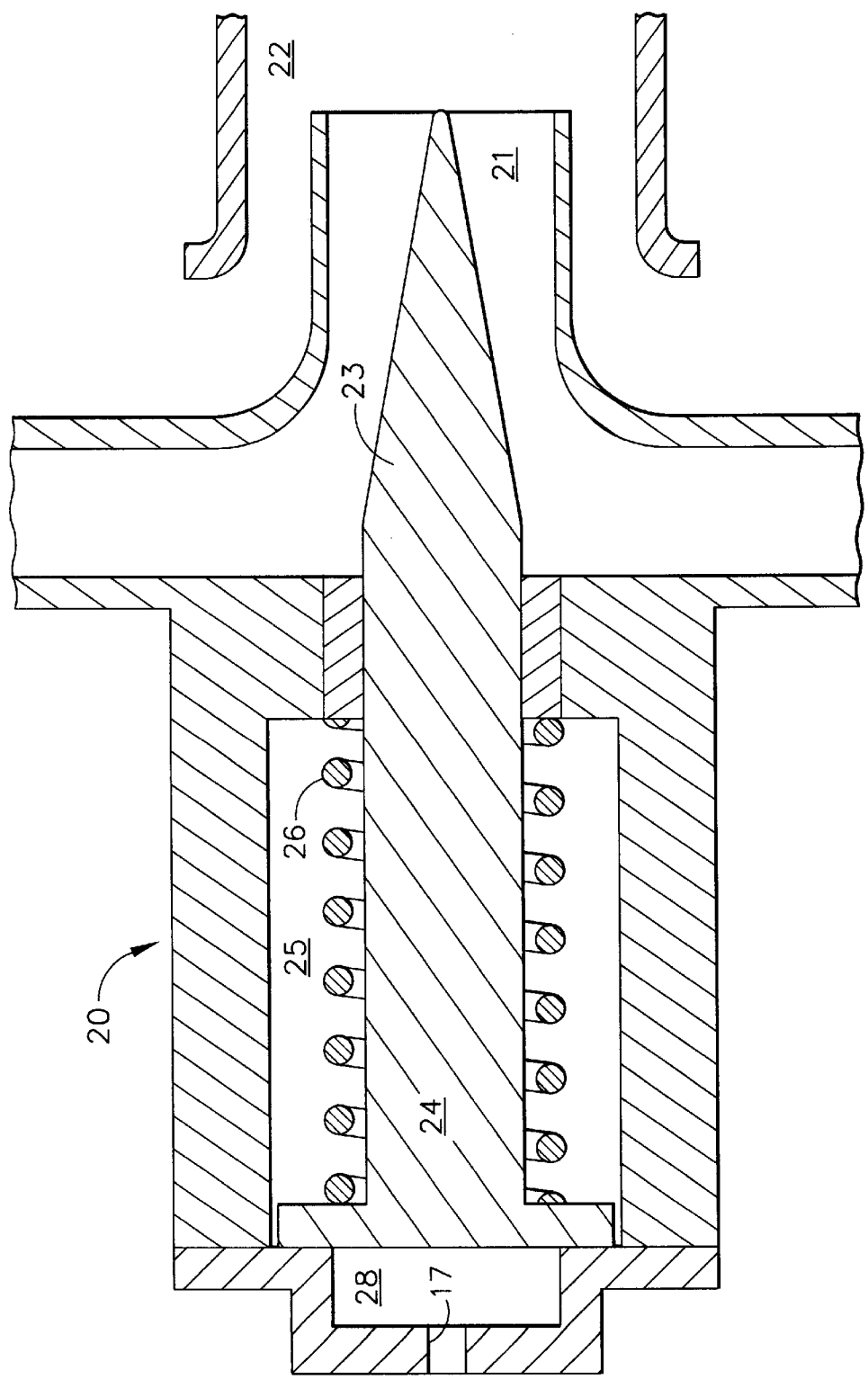
FIG. 2 is a sectional view of the ejector nozzle of a prior art diffuser vane cusp belled aperture with automatic ejector control.

FIG. 1 depicts a gas turbine engine annular diffuser as known within the art and described in U.S. Pat. No. 4,182,117 issued to Exley. As shown, diffuser 11 receives high energy airflow from a centrifugal compressor impeller 12. The diffuser 11 is constructed with radially extending diffuser vanes 13 constructed across the diffuser channel. The diffuser vane 13 gradually expands in width from the forward edge to the downstream edge. A curved cusp 16 is machined into the trailing edge of the diffuser vane 13 in order to minimize the wake caused by the diffuser vane 13 and to induce a vortex at the trailing edge. A bleed aperture 17 is constructed in the wall of diffuser 11 within the cusp 16 in the trailing edge of the diffuser vane 13. The bleed aperture 17 connects to a bleed flow manifold 18 and is designed to allow high energy air within the cusp region of the diffuser vane 13 to flow into the bleed flow manifold 18. An auxiliary airflow duct 19 communicates directly with the bleed flow manifold 18. The ejector 20, as shown in FIG. 2, is constructed in the auxiliary airflow duct 19 so that the bleed air forms the primary flow through the primary nozzle 21 of the ejector 20. Cooler ambient air is obtained from outside of the engine through the secondary nozzle 22 of the ejector 20. The primary nozzle 21 is controlled by a spike 23 which is axially movable within the ejector 20. The rearward portion of piston 24 of the spike 23 translates within a closed chamber 25. The piston 24 is biased by spring 26 to provide maximum primary airflow. The pressure in the bleed flow manifold 18 forces air through opening 27 into well 28 of close chamber 25 and exerts a force on one side of the piston 24 against the biasing spring 26 to cause movement of the spike 23 to reduce the primary airflow, thereby controlling the ratio of the primary to the secondary air.

In operation high energy air exits through the bleed aperture 17 at the trailing edge of the diffuser vane 13 and enters the bleed flow manifold 18 which supplies the auxiliary airflow duct 19. At low engine speeds, the bleed air is at relatively low energy and the ejector 20 is set for maximum primary flow essentially eliminating the introduction of ambient air. As engine speeds increase, the higher energy bleed air exerts a force on the spike 23 against its biased spring 26 to translate the spike 23 in a direction which reduces the amount of primary air flowing in the primary nozzle 21. As this happens, secondary airflow increases causing an auxiliary airflow of reduced temperature suitable to driving accessory devices.

The curved surface of the cusp 16 constructed in the trailing edge 15 of the diffuser vane 13 requires the bleed airflow to turn sharply in order to exit through the bleed aperture 17. This creates a centrifugal inertial separation effect which substantially eliminates contaminants in the bleed air stream, thereby eliminating the need for further separation or filtering of the auxiliary airflow.

Figure 3:
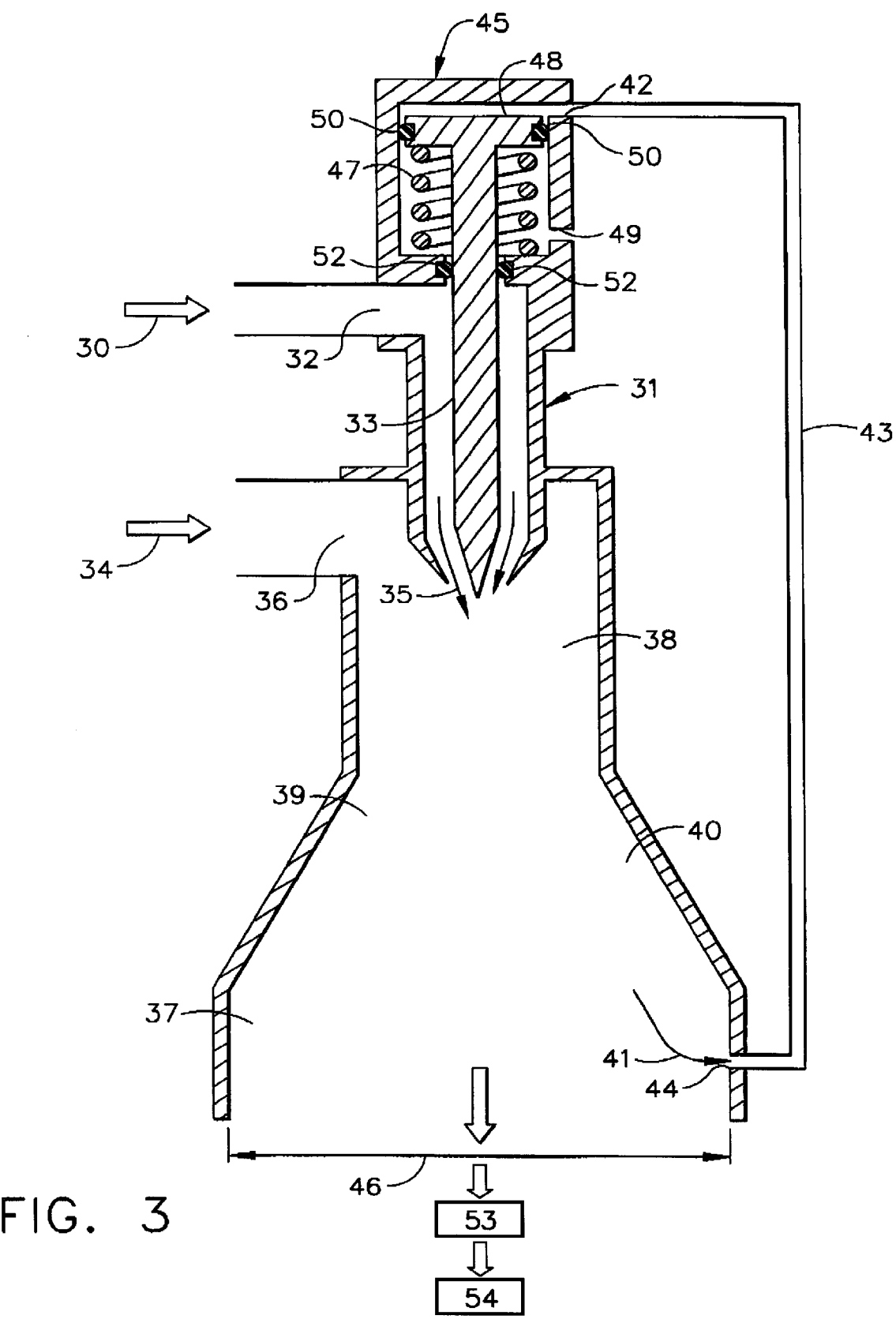
FIG. 3 is a sectional view of the variable geometry ejector for a bleed air system according the present invention.

The present invention, as depicted in FIG. 3, may be a system for bleeding air from a compressor in an engine comprising a primary inlet 32, a secondary inlet 36, a variable geometry ejector 31, a mixing section 38, a diffuser 40 with an upstream end 39 and a downstream end 37, a tube 43 comprised of a diffuser feedback port 44 and an actuator port 42, wherein said diffuser feedback port 44 is in communication with said downstream end 37 and said actuator port 42 is in communication with an ejector needle valve actuator 45. The temperature may be between −40 and 800° F.

The ejector needle valve actuator 45 may be comprised of valve with a needle 33, piston 48, at least one spring 47, and a vent 49. There may be a first seal ring 50 interposed between the ejector needle valve actuator 45 and piston 48. There may also be a second seal ring 52 interposed between the ejector needle valve actuator 45 and the needle 33. The needle 33 may extend into a nozzle area 35 of the valve. The springs 47 may be in communication with the ejector needle valve actuator 45 and the piston 48. The nozzle area 35 may be annular. High pressure air 30 may be introduced from the primary inlet 32. The primary inlet 32 may have an outside diameter between 0.1 and 6 inches and an inside diameter between 0.07 and 5.9 inches. The secondary inlet 36 may have an outside diameter between 0.15 and 9 inches and an inside diameter between 0.12 and 8.8 inches. This high pressure air may be at a flow between about 0 and 30 ppm and a pressure between about 10 and 200 psig. The needle 33, actuated by a piston 48, sets the nozzle area 35 of the valve to control the high pressure flow-rate into a mixing section 38. The low pressure air 34 may be led from said secondary inlet 36 at a flow between about 0 and 30 ppm and a pressure between about 0 and 40 psig to the mixing section 38 and allowed to mix with said high pressure nozzle flow 35 forming a ejector exit mixed flow 41. The ejector exit mixed flow 41 may be drawn from the upstream end 39 of the diffuser 40 to the downstream end 37 of diffuser 40 and allowed to flow through an opening 46 and a diffuser feedback port 44. The opening 46 may lead through a prioritization valve 53 to a NBC (Nuclear, Biological, Chemical) system 54. Air drawn through said diffuser feedback port 44 may be drawn through the tube 43 to the actuator port 42 and introduced to the ejector needle valve actuator 45. As such, the downstream pressure may be used to integrally control the geometry and pressure of the ejector exit flow.

Also disclosed is a method for bleeding air from a multi-stage compressor in an engine comprising allowing high pressure air 30 to flow through a primary inlet 32 to a nozzle area 35, wherein a portion of a needle 33 is contained. The high pressure air may have a pressure between about 10 and 200 psig and a flow between about 0 and 30 ppm prior to flowing through the primary inlet 32. The temperature may be between about −40 and 800 ° F. The needle 33, actuated by a piston 48, sets the nozzle area 35 of the valve to control the high pressure flow-rate into a mixing section 38. Low pressure air 34 may be introduced to a secondary inlet 36 where the flow may be between about 0 and 30 ppm and the pressure between about 0 and 40 psig. The low pressure air 34 may flow from the secondary inlet 36 to the mixing section 38. The high pressure nozzle flow 35 may mix with low pressure air 34 to create ejector exit mixed flow 41 with a pressure between the high pressure nozzle flow 35 and the pressure of the low pressure air 34. The ejector exit mixed flow 41 may flow from the upstream end 39 of the diffuser 40 to the downstream end 37 of the diffuser 40. A portion of ejector exit mixed flow 41 may be introduced to a diffuser feedback port 44 and the remainder may be allowed to flow to an opening 46. Air that flows through the opening 46 may be led through a prioritization valve 53 to a NBC system 54. It is known within the art that engine bleed air from the turbine engine compressor, may be regulated by the Prioritization valve 53 or NBC system 54. The portion of ejector exit mixed flow 41 may be introduced to said diffuser feedback port 44, may be drawn through a tube 43 to the actuator port 42 of said tube 43, and introduced to an ejector needle valve actuator 45, wherein the piston 48 may be contained and a vent 49. The position of the piston 48 may be controlled by the difference in force created by spring 47 in communication with said piston 48 and the static pressure of said ejector exit mixed flow 41 introduced through said actuator port 42 to ejector needle valve actuator 45.

It should be understood, of course, that the foregoing relates to preferred embodiments of the invention and that modifications may be made without departing from the spirit and scope of the invention as set forth in the following claims.

We claim:

1. A system for bleeding air from a compressor in an engine comprising:

a primary inlet;

a secondary inlet;

a variable geometry ejector for introducing air from said primary inlet;

a mixing section for mixing said introduced air from said primary inlet with air from said secondary inlet;

a diffuser downstream from said mixing section with an upstream end and a downstream end;

a tube comprised of a diffuser feedback port and an actuator port, wherein said diffuser feedback port is in communication with said downstream end of said diffuser and said actuator port is in communication with an ejector needle valve actuator;

said ejector needle valve actuator is comprised of a needle connected to a piston, and at least one spring for providing biasing force against said piston, said at least one spring located in an ambient air pressure equalized compartment, having a vent to ambient air pressure, said ambient air pressure separate and distinct from air flow related to said primary and secondary inlets;

said variable geometry ejector receives said needle extending into a nozzle area, wherein high pressure air from said primary inlet is contained therein, said needle is actuated by said piston and sets the nozzle area to control the high pressure flow rate into said mixing section, wherein low pressure air from said secondary inlet is drawn and allowed to mix in said mixing section with said high pressure nozzle flow forming an ejector exit mixed flow; and said ejector exit mixed flow is drawn from said upstream end of said diffuser to said downstream end of said diffuser and allowed to flow to an opening and said diffuser feedback port, wherein air drawn to said diffuser feedback port is drawn to said actuator port and introduced to said ejector needle valve actuator as pressure to actuate said piston against said biasing force of said at least one spring in said ambient air pressure equalized compartment.

2. A system as in claim 1, further comprising a first seal ring interposed between said ejector needle valve actuator and said piston.

3. A system as in claim 1, further comprising a second seal ring interposed between said ejector needle valve actuator and said needle.

4. A system as in claim 1, wherein said high pressure air is of a pressure between 10 and 200 psig.

5. A system as in claim 1, wherein said high pressure air has a flow between 0 and 30 ppm.

6. A system as in claim 1, wherein said low pressure is of a pressure between 0 and 40 psig.

7. A system as in claim 1, wherein said low pressure air has a flow between 0 and 30 ppm.

8. A system as in claim 1, wherein the temperature is between −40 and 800° F.

9. A system for bleeding air from a compressor in an engine comprising:

a primary inlet;

a secondary inlet;

a variable geometry ejector for introducing air from said primary inlet;

a mixing section for mixing said introduced air from said primary inlet with air from said secondary inlet;

a diffuser downstream from said mixing section with an upstream end and a downstream end;

a tube comprised of a diffuser feedback port and an actuator port, wherein said diffuser feedback port is in communication with said downstream end of said diffuser and said actuator port is in communication with an ejector needle valve actuator;

said ejector needle valve actuator is comprised of a needle connected to a piston, and at least one spring for providing biasing force against said piston, said at least one spring located in an ambient air pressure equalized compartment having a vent to ambient air pressure, said ambient air pressure separate and distinct from air flow related to said primary and secondary inlets;

said variable geometry ejector receives said needle extending into a nozzle area of a valve, wherein high pressure air introduced from said primary inlet at a flow between 0 and 30 ppm and a pressure between 10 and 200 psig is contained, said needle, actuated by said piston, sets the nozzle area of said valve to control the high pressure flow rate into said mixing section, wherein low pressure air is led from said secondary inlet at a flow between 0 and 30 ppm and pressure between 0 and 40 psig to said mixing section and allowed to mix with said high pressure nozzle flow to form an ejector exit mixed flow; and said ejector exit mixed flow is drawn from said upstream end of said diffuser to said downstream end of diffuser and allowed to flow through an opening to a prioritization valve/NBC system and said diffuser feedback port, wherein air drawn to said diffuser feedback port is drawn to said actuator port and introduced to said ejector needle valve actuator as pressure to actuate said piston against said biasing force of said at least one spring in said ambient air pressure equalized compartment.

10. A system as in claim 9, further comprising a first seal ring interposed between said ejector needle valve actuator and said piston.

11. A system as in claim 9, further comprising a second seal ring interposed between said ejector needle valve actuator and said needle.

12. A system as in claim 9, wherein the temperature is between −40 and 800° F.

13. A system as in claim 9, wherein said primary inlet has an outside diameter between 0.1 and 6 inches.

14. A system as in claim 9, wherein said primary inlet has an inside diameter between 0.07 and 5.9 inches.

15. An apparatus as in claim 9, wherein said secondary inlet has an outside diameter between 0.15 and 9 inches.

16. An apparatus as in claim 9, wherein said secondary inlet has an inside diameter between 0.12 and 8.8 inches.

17. An apparatus as in claim 16, wherein said secondary inlet has an outside diameter between 0.15 and 9 inches.

18. An apparatus as in claim 16, wherein said secondary inlet has an inside diameter between 0.12 and 8.8 inches.

19. An apparatus for bleeding air from a compressor in an engine comprising:

a primary inlet;

a secondary inlet;

a variable geometry ejector for introducing air from said primary inlet;

a mixing section for mixing said introduced air from said primary inlet with air from said secondary inlet;

a diffuser downstream from said mixing section with an upstream end and a downstream end;

a tube comprised of a diffuser feedback port and an actuator port, wherein said diffuser feedback port is in communication with said downstream end of said diffuser and said actuator port is in communication with an ejector needle valve actuator, wherein said ejector needle valve actuator is comprised of a needle attached to a piston;

a first seal ring and a second seal ring, wherein said first seal ring in interposed between said ejector needle valve actuator and said piston, and said second seal ring is interposed between said needle and said ejector needle valve actuator;

at least one spring located in an ambient air pressure equalized compartment defined by an area enclosed between said first and second seal rings and having a vent to ambient air pressure, said ambient air pressure separate and distinct from air flow related to said primary and secondary inlets, wherein said at least one spring is in communication with said piston;

said variable geometry ejector receives said needle extending into a nozzle area of a valve actuator, wherein high pressure air introduced from said primary inlet at a flow between 0 and 30 ppm and a pressure between 10 and 200 psig is contained, said needle, actuated by said piston, sets the nozzle area of the valve to control the high pressure flow rate into a mixing section, wherein low pressure air is led from said secondary inlet at a flow between 0 and 30 ppm and pressure between 0 and 40 psig to said mixing section and allowed to mix with said high pressure nozzle flow forming a ejector exit mixed flow, said ejector exit mixed flow being varied integrally; and said ejector exit mixed flow is drawn from said upstream end of said diffuser to said downstream end of diffuser and allowed to flow through an opening to a prioritization valve/NBC system and said diffuser feedback port, wherein air drawn to said diffuser feedback port is drawn to said actuator port and introduced to said ejector needle valve actuator as pressure to actuate said piston against a biasing force of said at least one spring in said ambient air pressure equalized compartment.

20. An apparatus as in claim 19, wherein the temperature is between −40 and 800° F.

21. An apparatus as in claim 19, wherein said primary inlet has an outside diameter between 0.1 and 6 inches.

22. An apparatus as in claim 19, wherein said primary inlet has an inside diameter between 0.09 and 5.9 inches.

23. A method for bleeding air from a multi-stage compressor in an engine comprising:

allowing high pressure air to flow through a primary inlet to a nozzle area, wherein a portion of a needle is contained, and said needle, actuated by a piston, sets the nozzle area of a valve to control the high pressure flow rate into a mixing section;

introducing low pressure air to a secondary inlet and allowing said low pressure air to flow from said secondary inlet to said mixing section;

mixing said high pressure nozzle flow with said low pressure air to create ejector exit mixed flow with a pressure between said high pressure nozzle flow and said low pressure air;

allowing said ejector exit mixed flow to flow from the upstream end of a diffuser to the downstream end of said diffuser, wherein a portion of said ejector exit mixed flow is introduced to a diffuser feedback port and the remainder is allowed to flow to an opening;

drawing said portion of ejector exit mixed flow introduced to said diffuser feedback port through a tube to the actuator port of said tube and introducing to an ejector needle valve actuator, wherein said needle is partially contained within an ambient air pressure equalized compartment having a vent to ambient air pressure;

maintaining an ambient air equalized pressure in said ejector needle valve actuator pressure equalized compartment; and controlling the position of said piston by the difference in force created by at least one spring contained within said pressure equalized compartment in communication with said piston and the static pressure of said ejector exit mixed flow introduced through said actuator port in communication with said piston in said ejector needle valve actuator.

24. A method as in claim 23, wherein said opening is in communication with a prioritization valve.

25. A method as in claim 23, wherein said opening is in communication with a NBC system.

26. A method as in claim 23, wherein said high pressure air is of a pressure between 10 and 200 psig.

27. A method as in claim 23, wherein said high pressure air has a flow between 0 and 30 ppm.

28. A method as in claim 23, wherein said low pressure is of a pressure between 0 and 40 psig.

29. A method as in claim 23, wherein said low pressure air has a flow between 0 and 30 ppm.

30. A method as in claim 23, wherein the temperature is between −40 and 800 ° F.

* * * * *